March 2, 1937.  J. J. McCOY  2,072,764

CAR AND TRUCK HOLDER

Filed April 22, 1936

James J. McCoy
INVENTOR

BY Victor J. Evans & Co.
ATTORNEY

Patented Mar. 2, 1937

2,072,764

UNITED STATES PATENT OFFICE 2,072,764

CAR AND TRUCK HOLDER

James J. McCoy, Pocatello, Idaho

Application April 22, 1936, Serial No. 75,800

1 Claim. (Cl. 188—31)

This invention relates to a motor vehicle holding device, and has for the primary object the provision of a simple and inexpensive device of this character which may be easily and quickly adapted to a motor vehicle and which may be conveniently brought into operation for holding the vehicle against accidental movement in either direction independent of the brakes of the vehicle so that should the brakes fail to hold the vehicle when standing on a hill, said device will positively prevent the vehicle from moving away from its parked position.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1:
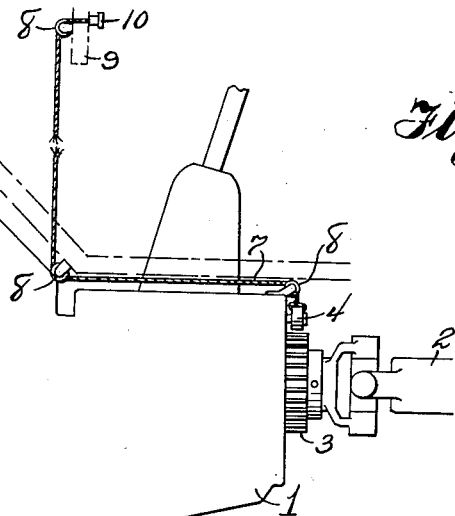
Figure 1 is a fragmentary side elevation showing a part of a motor vehicle with my invention adapted thereto.
Figure 2:
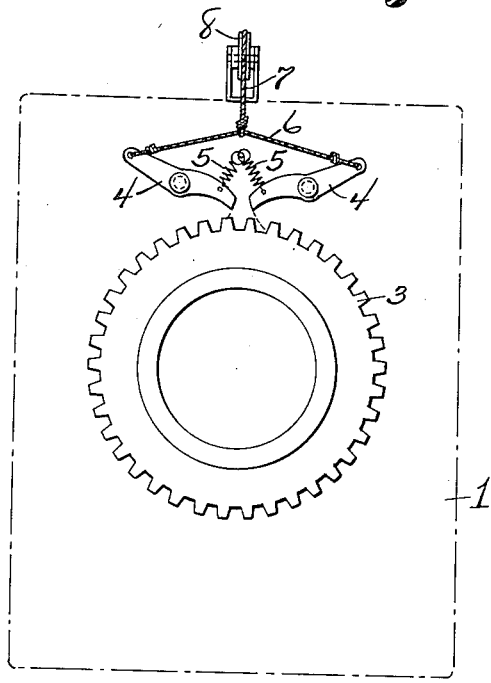
Figure 2 is a transverse sectional view showing my invention in an inoperative position.

Referring in detail to the drawing, the numeral 1 indicates a transmission housing of a motor vehicle and 2 the propeller shaft. A gear 3 is secured to the propeller shaft 2 adjacent the housing 1 and pivoted to the latter are opposed dogs 4 either of which is adapted to engage with teeth of the gear 3. The dogs 4 are so arranged that when one dog is in mesh with teeth of the gear, the other dog will rest upon a tooth of the gear. Coil springs 5 are secured to the dogs and to the housing 1 for normally holding the dogs disengaged from the gear. Flexible elements 6 are secured to the dogs and to a flexible element 7. The flexible element 7 is trained over pulleys 8 and extends to the instrument board 9 of the motor vehicle and is equipped with a finger piece 10. A pull upon the finger piece 10 will move one of the dogs in mesh with the teeth of the gear, depending on which dog is opposite to a space between a pair of teeth of the gear.

In operation, when the motor vehicle is brought to a stop and especially on down grade, a pull is made upon the finger piece 10 bringing a dog into mesh with the teeth of the gear and if the dog is the proper one to prevent movement of the vehicle downhill it will become wedged against one of the teeth preventing movement of the vehicle. However, should the dog not be the proper one to hold the vehicle against movement, a slight movement of the vehicle will bring that dog out of mesh with the teeth and the other dog in mesh with the teeth. Thereby with this arrangement it is possible to hold the vehicle either against forward or reverse movement. After a dog wedges against a tooth of the gear the finger piece 10 may be released and as soon as power is applied to the propeller shaft the dog will be disengaged from the teeth of the gear by its respective spring.

While I have described the gear 3 as being added to the motor vehicle construction, it is possible to employ one of the gears of the transmission, that is, the gear which is secured to the propeller shaft and have the dogs located within the housing 1.

Having described the invention, I claim:

A motor vehicle holding device comprising a gear secured to a propeller shaft of a motor vehicle, opposed dogs pivoted to a fixed part of the motor vehicle and so arranged that when one dog is in mesh with the gear the other dog will be resting upon a tooth of the gear, springs connected to said dogs for holding them disengaged from the gear, a flexible element connected to the dogs, and a finger piece connected to the flexible element.

JAMES J. McCOY.